United States Patent
Serizawa et al.

(10) Patent No.: US 6,491,443 B1
(45) Date of Patent: Dec. 10, 2002

(54) SLEEVE FOR OPTICAL CONNECTOR AND RECEPTACLE

(75) Inventors: Naoshi Serizawa, Shizuoka (JP); Junichi Matsushita, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/536,716

(22) Filed: Mar. 28, 2000

(30) Foreign Application Priority Data

Nov. 8, 1999 (JP) .......................................... 11-316660

(51) Int. Cl.[7] ................................................. G02B 6/38
(52) U.S. Cl. .......................................... 385/61; 385/33
(58) Field of Search .............................. 385/60, 93, 56, 385/92, 117, 33

(56) References Cited

U.S. PATENT DOCUMENTS

| | | | |
|---|---|---|---|
| 4,143,940 A | * 3/1979 | Khoe | 350/96.15 |
| 4,721,353 A | * 1/1988 | Khoe et al. | 385/33 |
| 4,733,936 A | 3/1988 | Mikolaicyk et al. | 350/96.21 |
| 4,776,667 A | * 10/1988 | Yoshida et al. | 350/96.25 |
| 4,834,494 A | 5/1989 | DeMeritt et al. | 350/96.21 |
| 5,293,438 A | * 3/1994 | Konno et al. | 385/35 |
| 5,647,041 A | 7/1997 | Presby | 385/43 |
| 5,987,205 A | * 11/1999 | Moseley et al. | 385/125 |
| 6,113,280 A | * 9/2000 | Nagaoka et al. | 385/53 |
| 6,197,015 B1 | * 3/2001 | Wilson | 604/524 |

FOREIGN PATENT DOCUMENTS

| | | |
|---|---|---|
| JP | 6-33443 | 8/1994 |

OTHER PUBLICATIONS

Smith, Warren J., Modern Optical Engineering, MacGraw–Hill 3rd Ed. pp. 281–285.*

* cited by examiner

Primary Examiner—Cassandra Spyrou
Assistant Examiner—Euncha Cherry
(74) Attorney, Agent, or Firm—Armstrong, Westerman & Hattori, LLP

(57) ABSTRACT

A sleeve (21) includes a core (22) of transparent synthetic resin and a cladding (23), also of transparent synthetic resin, having a smaller refractive index than the core. The core includes an optical waveguide (24) extending in an optical axial direction to taper in a conical shape and a lens (27) formed at the large diameter end of the waveguide. The lens receives light and converges it. There is a circular flange-like guide integral to the outer wall in the vicinity of the lens. The cladding (23) is formed concentrically with the core in intimate contact with the outer wall of the core. The configuration improves the transmission efficiency of light and contributes to cost reduction of the sleeve.

9 Claims, 10 Drawing Sheets

SLEEVE FOR OPTICAL CONNECTOR AND RECEPTACLE

BACKGROUND OF THE INVENTION

1. Field of the Invention

The present invention relates to a sleeve for an optical connector which is arranged between an optical fiber and an optical element module and serves to transmit light emitted from one to the other. The present invention also relates to a receptacle constituting an optical connector together with an optical plug and provided with the sleeve for the optical connector.

2. Description of the Related Art

A typical sleeve for an optical connector (hereinafter referred to as "sleeve") located between the optical fiber and the optical element module is disclosed in J-UM-6-33443 by the inventors of the invention.

FIG. 12 is a horizontal sectional view of a conventional optical connector, and FIG. 13 is a horizontal sectional view of the receptacle shown in FIG. 12. In FIGS. 12 and 13, reference numeral 1 denotes a sleeve, and reference numeral 2 denotes an optical connector.

Sleeves 1 are attached to a receptacle (connector on the side of a device) constituting the optical connector 2. These sleeves 1 are arranged between optical element modules 4 (consisting of a light receiving element module and a light emitting element module) and a pair of optical fibers 6 which are attached to an optical plug (connector on the side of the optical fiber) constituting the optical connector 2, respectively. The sleeves 1 serve to make an optical connection between the optical element modules 4 and optical fibers 6.

A more detailed explanation will be given of the optical connector 2 as well as the sleeves 1.

The optical connector 2 includes the receptacle 3 and the optical plug 5 fit into the receptacle 3.

The receptacle 3, as shown in FIGS. 12 and 13, has a housing 7 made of synthetic resin and having a pair of housing chambers 8. The housing chambers 8 each houses an optical element module 4 which is supported by a back sheet 9 made of elastic material such as rubber. The rear of the housing chambers 8 is covered with a cap 10. The receptacle 3 has a pair of receiving cylinders 12 which are arranged in front of the housing chambers 8, and extended forward so as to accord with the respective axes of lenses 11. The sleeves 1 are inserted in the receiving cylinders 12, respectively.

The sleeve 1 can be formed by grinding both end surfaces of the optical fiber composed of a core and a cladding (not shown) after it has been secured to a cylindrical holder 14.

On the other hand, the optical plug 5 fit in the receptacle 3, as seen from FIG. 12 and 14 which is a horizontal sectional view of the optical plug shown in FIG. 12, includes a pair of ferule assemblies 15 each covering the optical fiber with its end face exposed at the tip of the assembly, a plug housing 17 with a pair of cylindrical partitions 16 for protecting the ferule assemblies 15 housed therein, a spring cap 17 fit over the plug housing 18 and a boot 19 fit over the rear of the spring cap 18.

The plug housing 17 has shoulders 17a each to be engaged with a flange 15a formed on the rear half of the periphery of each ferule assembly 15. The ferule 15 is urged forward normally by a spring 20 which is located between the flange 15a and inner cylinder 18a of the spring cap 18.

As shown in FIG. 14, by engagement between the flange 15a and shoulder 17a, the tip A of the ferule assembly is always pulled more internally than the tip of the plug housing 17. The tip A of the ferule assembly 15 corresponds to the light-incident/emitting face of the optical fiber 6.

As regards the above configuration, referring to FIG. 12, an explanation will be given of connection between the receptacle 3 and the optical plug 5.

When the receptacle 3 is fit over the optical plug 5, the receiving cylinders 12 advance into the plug housing 17, and the ferule assemblies 15 also advance into the receiving cylinders 12. At this time, the ferule assembly 15 is brought into contact with the tip of the receiving cylinder 12 and a suitable contact pressure is kept by the elastic force by the spring 20.

In this state, the tip A (FIG. 14) and sleeve 1 are arranged with a minimum gap (not shown) kept. Therefore, the loss of the gap can be minimized.

The prior art described above, in which the sleeve 1 has an optical fiber 13 and is formed in a ring-shape, presents the following problems.

As shown in FIG. 15, with respect to a light beam c1 (within a range of a critical angle) which is propagated through an optical fiber 6 and sleeve 1 along an optical path indicated by arrow in FIG. 15, when the light receiving face 4a of the light receiving element module 4 is smaller than the light-emitting face 1a of the sleeve 1 (the width of the module 4 is smaller by d than that of the optical fiber 13 on the one side with respect to a center line), the light beam c1 may not be received by the light receiving element module 4. This is one of causes reducing the transmission efficiency.

Although not shown, when the light beam emitted from the light emitting face (not shown) of the light emitting element module is diffusive-LED light, part of the light cannot enter the sleeve 1. This is one cause reducing the transmission efficiency. Even if such a light beam is incident on the sleeve 1, it becomes a light beam c2 out of the critical angle range. Therefore, the light c2 does not reflect totally but permeates through the sleevel. The light c2 will be not be propagated.

Further, the prior art intends to minimize the gap loss to improve the transmission efficiency. However, a slight gap between the optical fiber 6 and sleeve 1 and axis displacement therebetween may influence the transmission efficiency.

There is also a problem relative to productivity of the sleeve 1 as well as the problem of the transmission efficiency.

Specifically, as described above, in order to improve the optical characteristic (transmission efficiency of light) of the sleeve 1, after the optical fiber 13 is inserted in and attached to the holder 14, both end surfaces of the optical fiber 13 as well as the holder 14 must be ground using abrasives of plural grain sizes. Thus, production of the sleeve 1 requires many manufacturing steps inclusive of necessary previous steps of making its components, and is inferior in productivity.

Further, production of the sleeve 1, which requires monitoring the production status of its components and testing the size, is involved with complicate production management. This deteriorates the productivity of the sleeve and increases the production cost.

It is also demanded to assemble the sleeve with a receptacle smoothly.

SUMMARY OF THE INVENTION

A first object of the invention is to provide a sleeve for an optical connector, capable of improving the transmission efficiency and improving the productivity to reduce the production cost.

A second object of the invention is to provide an improved receptacle which can be smoothly assembled with the sleeve.

In order to attain the first object, in accordance with the invention, there is provided a sleeve comprising: a core of transparent synthetic resin; and a cladding of transparent synthetic resin and having a smaller refractive index than the core, wherein the core includes an optical waveguide extending in an optical axial direction with an outer wall to taper in a conical shape and a lens formed at the large diameter end of the waveguide, the lens receiving light and converging it, and the cladding is formed concentrically with the core in intimate contact with an side wall of the core.

In this configuration, the light outgoing from one of the optical fiber and optical element module is received and converged by the lens. The light is propagated through the waveguide while repeating total reflection and gradually converged. Thus, the transmission efficiency of light is improved.

The discrepancy of the optical axis from the sleeve can be relaxed by the lens. The outer wall of the waveguide is covered with the cladding which prevents scratch or dust from being deposited. This contributes to an improvement of transmission efficiency of light and also to easiness of the work of assembling. Further, the sleeve is made in such a manner that the cladding is formed in contact with the outer wall of the waveguide after the core is molded. Therefore, if the molding die for the core is mirror-finished, polishing is not required afterwards. The high accuracy of dimension of the molding die permits the suitable supply of the sleeve for the optical connector. Thus, the sleeve can be made by a fewer steps than the prior art.

Preferably, the core has a circular flange-like guide integral to the outer wall in the vicinity of the lens, the guide having a belt-shaped circumferential surface to be coplanar with that of the cladding. In this configuration, the guide and cladding serve as the holder in the conventional sleeve. This reduces the number of components by one. Further, provision of the guide easily assures the gate position of the core. The cladding can be molded while the guide is held.

Preferably, the guide has an end face flush with an apex of the lens. In this configuration, when either one of the optical fiber and the optical element module is brought into contact with the end face of the guide, the apex of the lens is also brought into contact therewith. Therefore, gap loss between the apex and lens can be restricted. The lens is also protected by the guide.

Preferably, the cladding and/or the guide has a groove or projection formed on their outer surface. In this configuration, the sleeve can be assembled into the receptacle without misconceiving the direction of assembling.

Preferably, the sleeve has an open space formed at a small diameter end of the waveguide so as to separate the core from the cladding. In this configuration, a part of the molding die can be arranged in the open space when the cladding is molded. This permits the core to be surely held within the molding die when the cladding is molded, thus increasing the productivity.

The cladding is made distinguishable from the core and colored so as to reflect light propagated through the waveguide.

In this configuration, the sleeve can be assembled into the receptacle without misconceiving the direction of assembling.

Preferably, the lens is covered with an antireflective coating. Therefore, it is possible to prevent the amount of light incident on the lens from reduced. Thus, a large amount of light can be incident on the lens and propagated.

Preferably, the sleeve comprises a light emitting element embedded in the waveguide.

The sleeve and the one-core type fiber bi-directional communication system can further provide the effects of miniaturization, cost reduction and improvement in reliability.

In accordance with the invention, there is provided a receptacle including the sleeve and optical element modules having a light emitting element and a light receiving element module, wherein the sleeve is located between each of the optical element modules and corresponding one of two fibers of an optical plug coupled with the receptacle. In this receptacle, the transmission efficiency of light is improved and work relative to assembling is simple.

The above and other objects and features of the invention will be more apparent from the following description taken in conjunction with the accompanying drawings.

DESCRIPTION OF THE PREFERRED EMBODIMENTS

Figure 1A:
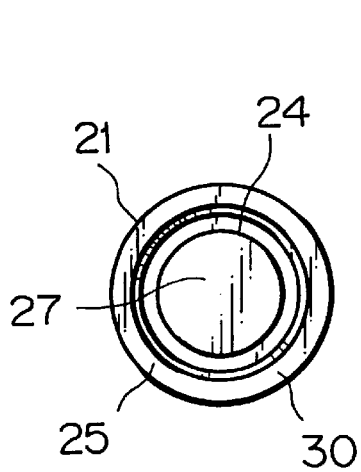
FIGS. 1A, 1B and 1C are a front view, a side view and a back view of one embodiment of the sleeve for an optical connector according to the invention.

Now referring to the drawings, an explanation will be given of various embodiments of the present invention.

Figure 1B:
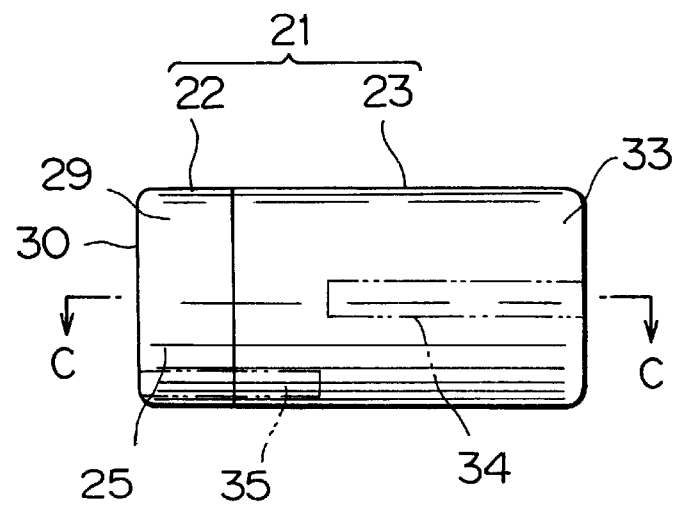
Figure 2:
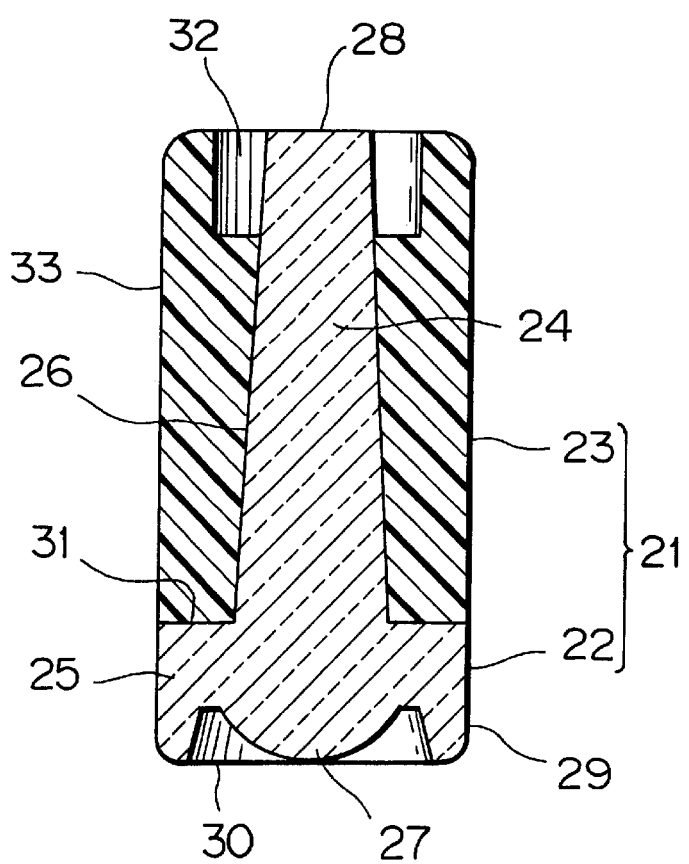
FIG. 2 is a sectional view taken in line C—C in FIG. 1B.
Figure 1C:
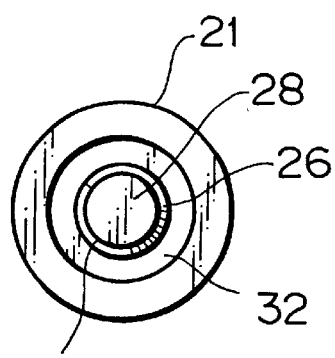

FIGS. 1A, 1B and 1C are a front view, a side view and a back view of one embodiment of the sleeve for an optical connector according to the invention, and FIG. 2 is a sectional view taken in line C—C in FIG. 1B.

Figure 13:
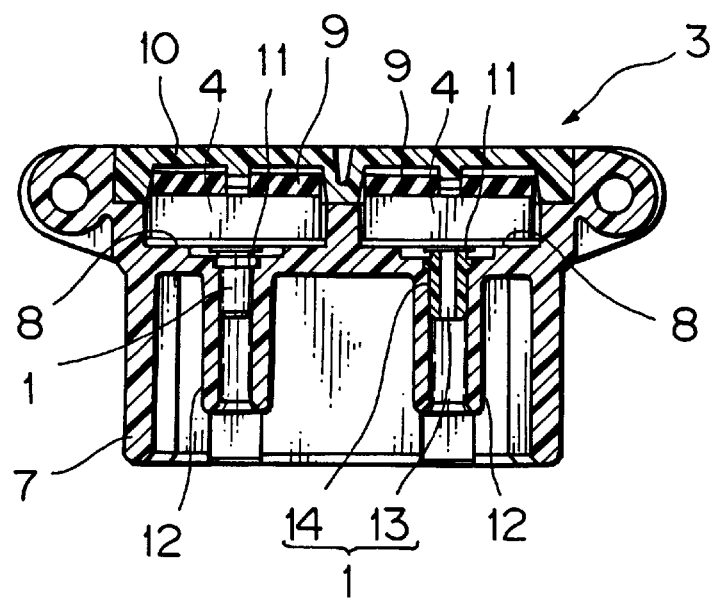
FIG. 13 is a sectional view in a horizontal direction of the receptacle shown in FIG. 12.
Figure 12:
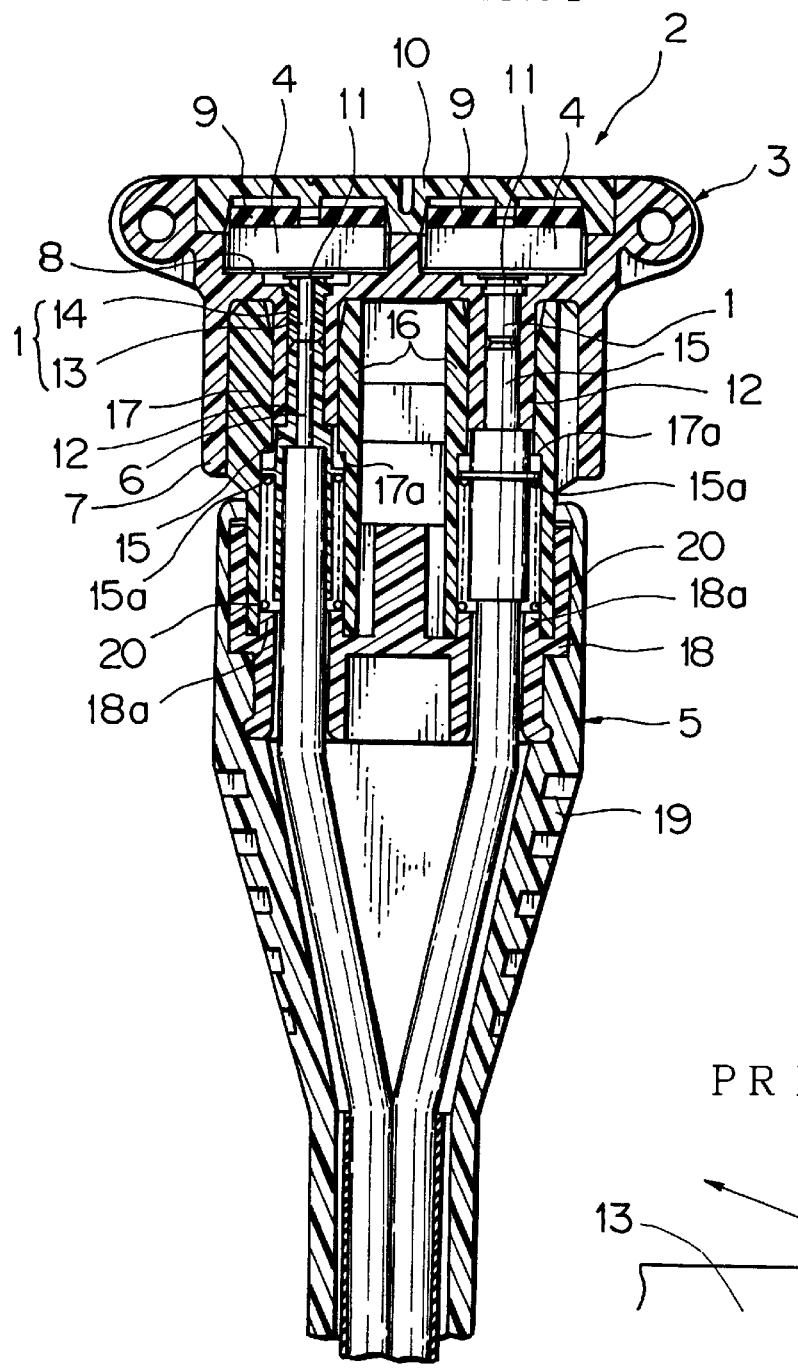
FIG. 12 is a sectional view in a horizontal direction of a conventional optical connector.
Figure 16:
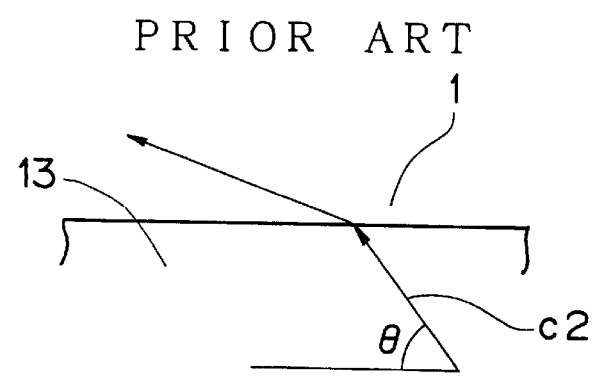
FIG. 16 is a view for explaining the state where the light out of a critical angle range is incident on the sleeve.
Figure 14:
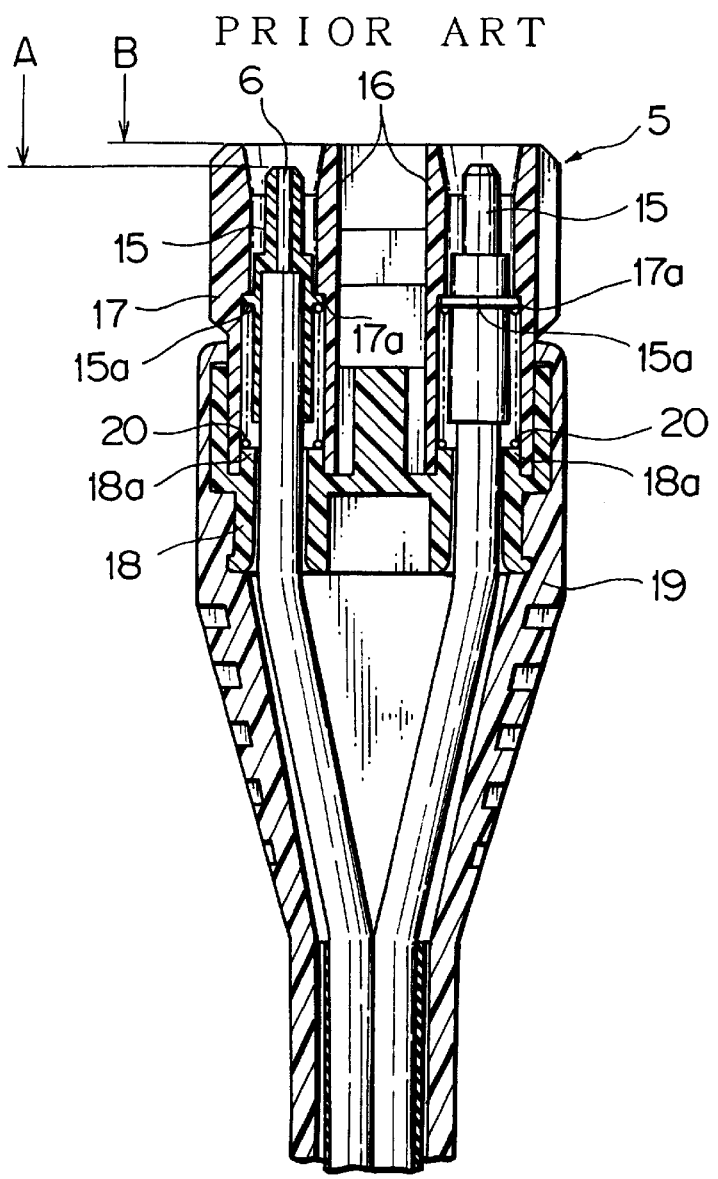
FIG. 14 is a sectional view in a horizontal direction of the optical plug shown in FIG. 12.
Figure 15:
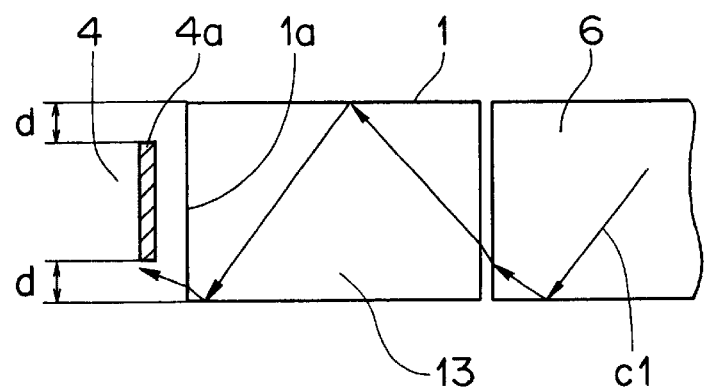
FIG. 15 is a view for explaining the state where light is propagated from an optical fiber to a light receiving element module through the sleeve shown in FIG. 12.

In these figures, a sleeve 21 for an optical connector (hereinafter referred to as simply "sleeve") is composed of a core 22 of synthetic resin and cladding 23. The sleeve 21 is formed in a cylindrical shape which is substantially coincides with the outer shape of the conventional sleeve 1 (FIGS. 12 and 13). The cladding 23 is made of the material with a smaller refractive index than that of the core 22.

The core 22, which is made of e.g. transparent polycarbonate, is composed of a guide 25 and a waveguide 24 extending therefrom. The waveguide 24 is conical-shaped with a side wall 26 tapered from the one end to the other end. The guide is integrally provided with a lens 27 which is convex outward and has a light-focusing function. The lens 27 is covered with an antireflective coating on the surface.

In this embodiment, the lens 27 serves as a light-receiving face and the other end of the waveguide 24 serves as a light emitting face. The sleeve 21 is extended in an optical axis between each of optical fibers 60 and an optical element module (a light receiving element module 46 or a light emitting element module 47) (see FIGS. 3 and 4). For example, the lens 27 has a diameter which is about 2/7 of the entire length of the sleeve 21, whereas the end face 28 has a diameter which is about 1/6 thereof.

The guide 25 is formed successively to the side wall 26 in the vicinity of the lens 27. The guide 25 is formed to have a ring-shape flange composed of a belt-shape circumferential face 29 and both end faces 30 and 31 perpendicular to it.

The belt-like circumferential face 29 is a standard for determining the position of the outer face of the cladding 23. The outer face of the cladding 23 is preferably formed to be coplanar with the belt-like circumferential face 29. Because of this, a receptacle 42 as described later can be easily assembled. Therefore, the stability of the sleeve 21 within the receptacle 42 can be improved. Where the outer face of the cladding 23 is not coplanar with the belt-like circumferential face 29, the above effect may not be obtained sufficiently.

The one end face 30 of the guide 25 is arranged so as to be flush with the apex of the lens 27. In the vicinity of the end face, the guide is formed in a ring shape so as to protect the outside of the lens 27 itself. The other end face 31 opposite to the end face 30 of the guide 25, which is formed to be flat, is kept in contact with the cladding 23.

On the other hand, the core 22 is apart from the cladding by an open space 32 at the side 26 in the vicinity of the end face 28 of the waveguide 24. The space 32 is formed in a ring-shape between the core and the cladding. The space 32 can be formed by placing a part of a molding die (not shown) at the position of the space.

Because of the presence of the space 32, the core 22 can be surely held within the molding die (not shown) when the cladding 23 is molded. Thus, displacement of the core when being molded can be surely prevented, thereby increasing the productivity. It should be noted that the wave guide 24 adjacent to the space 32 makes a boundary with an air layer. Such an arrangement gives no problem since the light propagated through the waveguide 24 does not extend over the critical angle because of the tapering of the side wall 26.

The cladding 23 is made of e.g. transparent polymetaclyl acid methyl (PMMA (metacle resin)), and makes an intimate contact with the side wall 26 of the waveguide 24 and end face 31 of the guide 25. The cladding 23 has a circular peripheral face 33 integral to the belt-like circumferential face 29.

When the cladding 23 is brought into intimate contact with the side wall 26 of the waveguide 24, a boundary face is formed between the waveguide 24 and the cladding 23. The cladding 23 serves to protect the waveguide 24.

The circumferential face 33 can be provided with a protrusion or groove in an extending direction of the sleeve 21. An example of the protrusion or groove is illustrated by 34 and 35 in FIG. 1B. The provision of such a protrusion or groove facilitates to decide which side is a lens side when the receptacle 42 is assembled. This assures the direction of assembling the sleeve 21. The correct direction of assembling does not deteriorate the transmission efficiency.

Instead of providing the protrusion or groove, the cladding 23 may be colored. In this case, the cladding 23 is preferably colored in the color capable of reflecting the light propagated through the waveguide 24. For example, if the emitting light color of the propagated light is red, cladding 23 may be made in transparent red.

Incidentally, the sleeve 21 can be manufactured in such a way that after the core 22 is molded, the cladding 23 in intimate contact with the side wall 26 of the waveguide 24 is molded in the two-color molding. The molding die (not shown) should be manufactured with a high degree of size precision. After the molding, the molding die is mirror-finished in order to omit the conventional step of polishing.

On the other hand, the sleeve 21, which is made by resin molding, can be manufactured in a fewer number of steps than before. The combination of the components in the present invention which is different from the prior art allows the production management to be simplified.

An explanation will be given of an optical connector provided with the sleeve 21 described above.

Figure 3:
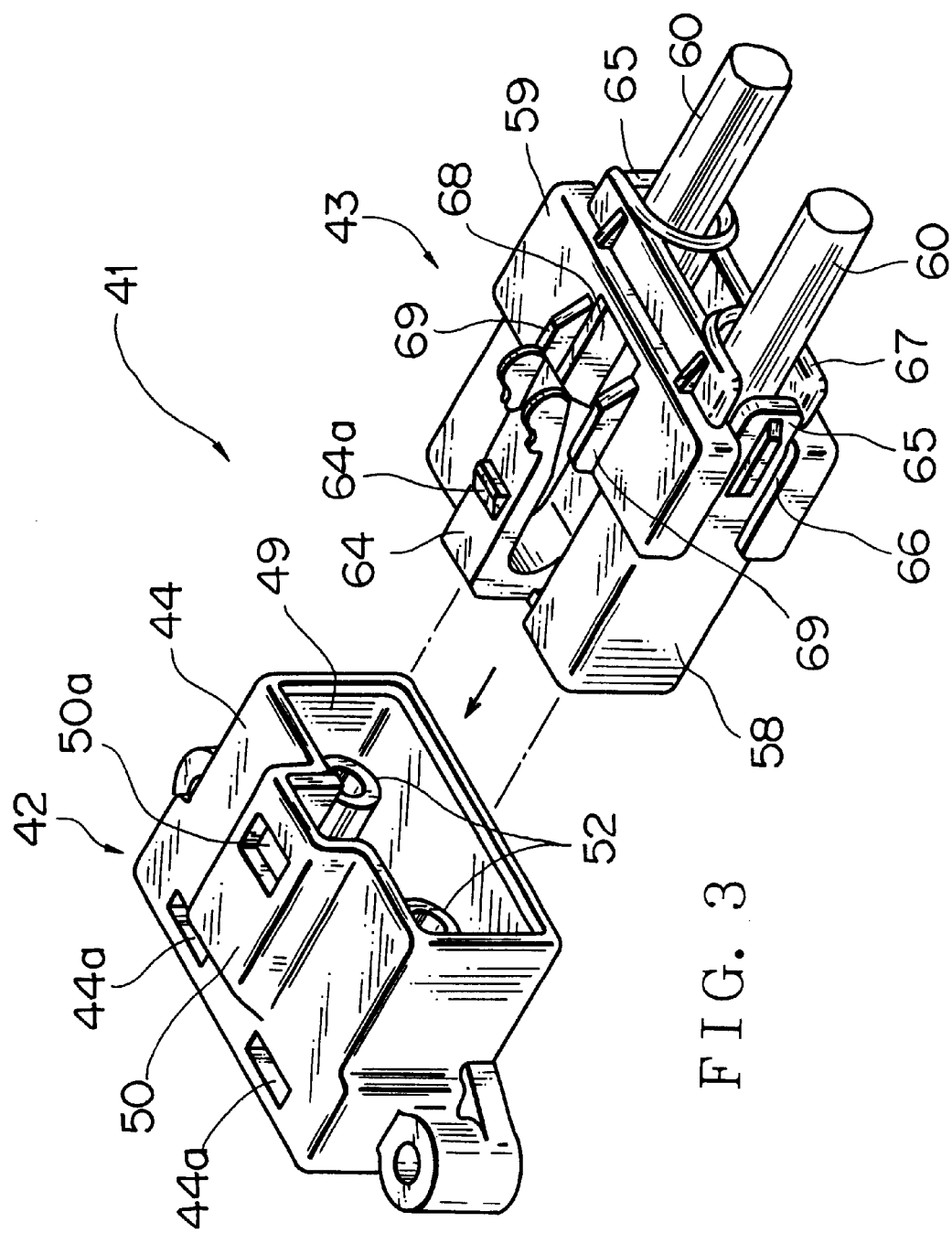
FIG. 3 is a perspective view of a receptacle and optical plug constituting an optical connector.

FIG. 3 shows an optical connector 41 which is used in a multiplex transmission circuit for a vehicle. The optical connector 41 is composed of a receptacle 42 and an optical plug 43 which are made of synthetic resin.

Figure 4:
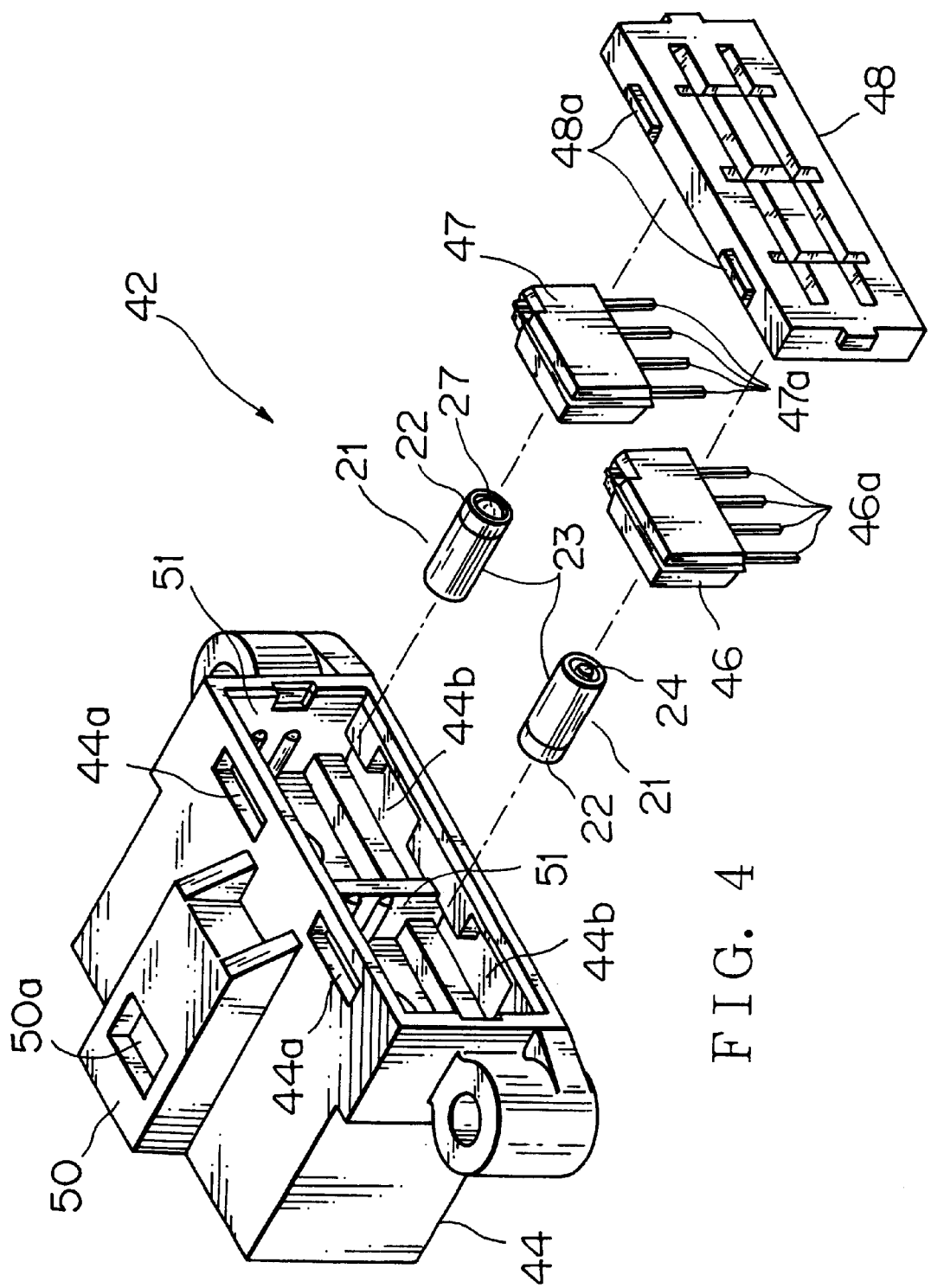
FIG. 4 is an exploded perspective view of the receptacle.

The receptacle 42, as shown in FIG. 3 and 4, has a square connector housing 44 whose front and rear are opened. The front opened portion of the connector housing 44 is fit over the optical plug 43. As shown in FIG. 4, a pair of sleeves 21, a pair of light element modules (light receiving module 46 and light emitting module 47) and a cap 48 are successively fit into the rear opened portion of the connector housing 44 (in a direction of an optical axis).

The connector housing 44 has a fitting portion 49 for the optical plug 43 in the front opened position. On the front upper wall thereof, the connector housing 44 is provided with an optical plug engagement portion 50 to be engaged with a locking arm 64 (described later) of the optical plug 43.

The optical plug engagement portion 50 is formed in such a fashion that a part of the fitting portion 49 protrudes from the interior of the connector housing 44 toward the exterior thereof. In the upper face of the optical plug engagement portion 50, a square engagement hole 50a is opened to be engaged with an engagement protrusion 64a of the locking arm 64.

As shown in FIG. 4, at the rear position, the connector housing 44 has a pair of chambers 51 for accommodating the light receiving element module 46 and light-emitting element module 47. Each chamber 51 has a pair of openings 44a and 44b which pass through the upper wall and lower wall, respectively (FIGS. 6A and 6B).

As shown in FIG. 4, the openings 44a and 44b are to be fit over projection pieces 48a formed at the upper and lower edges of a cap 48 (lower pieces 48a are not shown). The respective electrodes 46a and 47a of the light receiving element module 46 and light emitting element module 47 are to be externally extended through the openings 44b (FIGS. 6A and 6B). The electrodes 46a and 47a are to be soldered to a wiring board (not shown).

Figure 5:
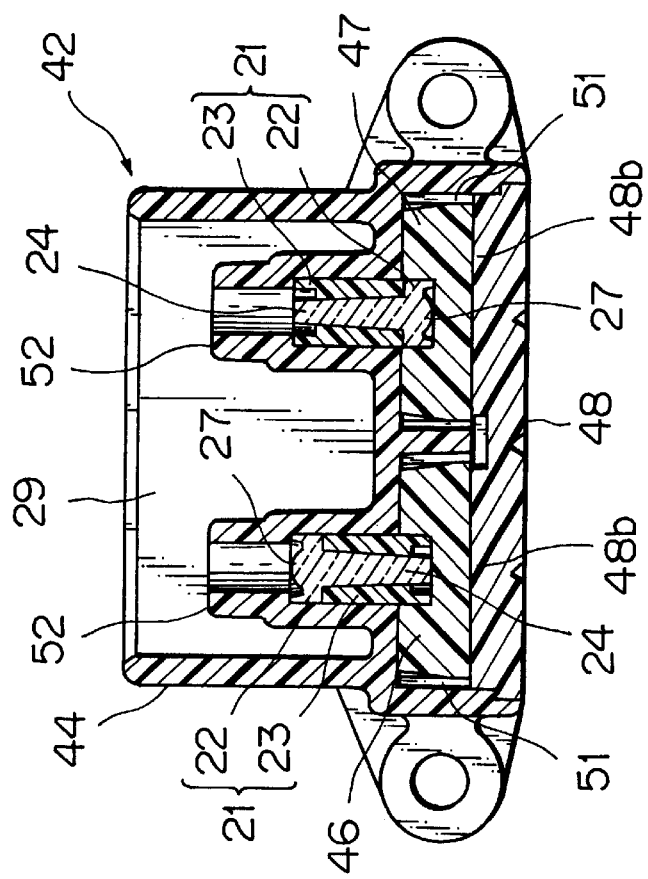
FIG. 5 is a sectional view in a horizontal direction of a receptacle.
Figure 6A:
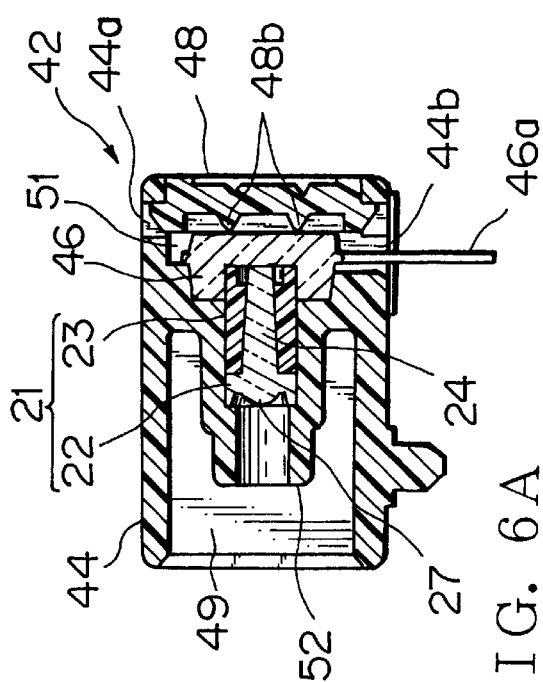
FIGS. 6A and 6B are sectional views showing the section in a vertical direction of the receptacle.
Figure 6B:
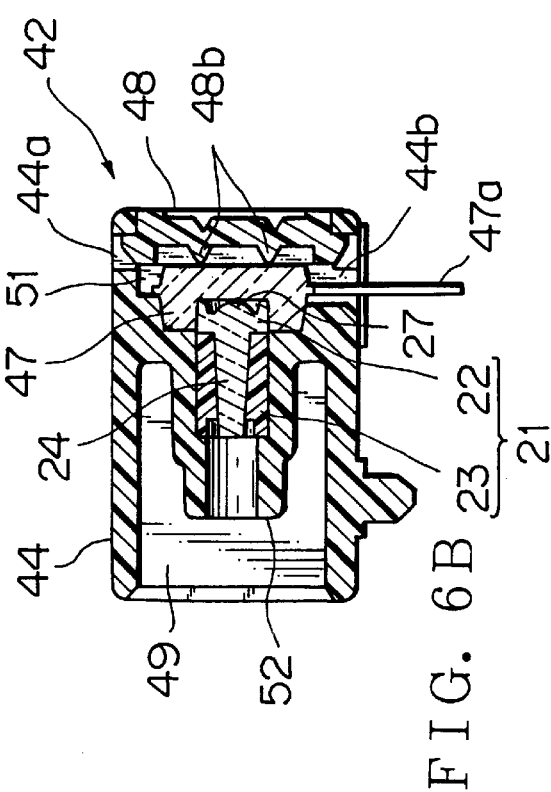

As shown in FIGS. 5, 6A, and 6B, in the middle portion of the interior of the connector housing 44, a pair of receiving cylinders 52 are extended to communicate the fitting portion 49 with the chambers 51 and projected into the fitting portion 49. The receiving cylinders 52 are formed integrally to the connector housing 44. The receiving cylinder 52 are formed to provide steps on its both inner and outer walls. The front portion of the cylinder 52 at a boundary of the inner step serves to mount the ferule assembly 57 of the optical plug 43 (FIG. 7) and the rear portion thereof serves to receive the sleeve 21 through the chamber 51.

Each of the sleeves 21 is positioned when it is brought into contact with the step. These sleeves 21 are to be inserted in their opposite directions (Their assembling directions are determined so that the lens 27 constitutes a light receiving face (FIG. 2)).

On the inner wall of the receiving cylinder 52 on the side where the sleeve 21 is inserted, a plurality (e.g. four) of minute projections for holding the sleeve 21 are formed at regular intervals.

The light-receiving element module 46 and the light receiving element module 47, whose structures are well known, are not explained in detail (see FIG. 4). However, it should be noted that the light receiving element module 46 includes light-receiving elements 46a (see FIG. 4, e.g. photo-diode in FIG. 8) and the light emitting element module 47 includes light-emitting elements 47a (see FIG. 4, e.g. light-emitting diode (LED)).

As the case may be, the light receiving element module 46 and light emitting element module 47 are also referred to as a light receiving/emitting element module, transmission/reception module or FOT (Fiber Optic Transceiver).

The cap 48 has two strips of triangular projections for pressing the light receiving element module 46 and the light emitting element module 47 against the corresponding sleeves 27 (see FIGS. 6A and 6B).

Figure 7:
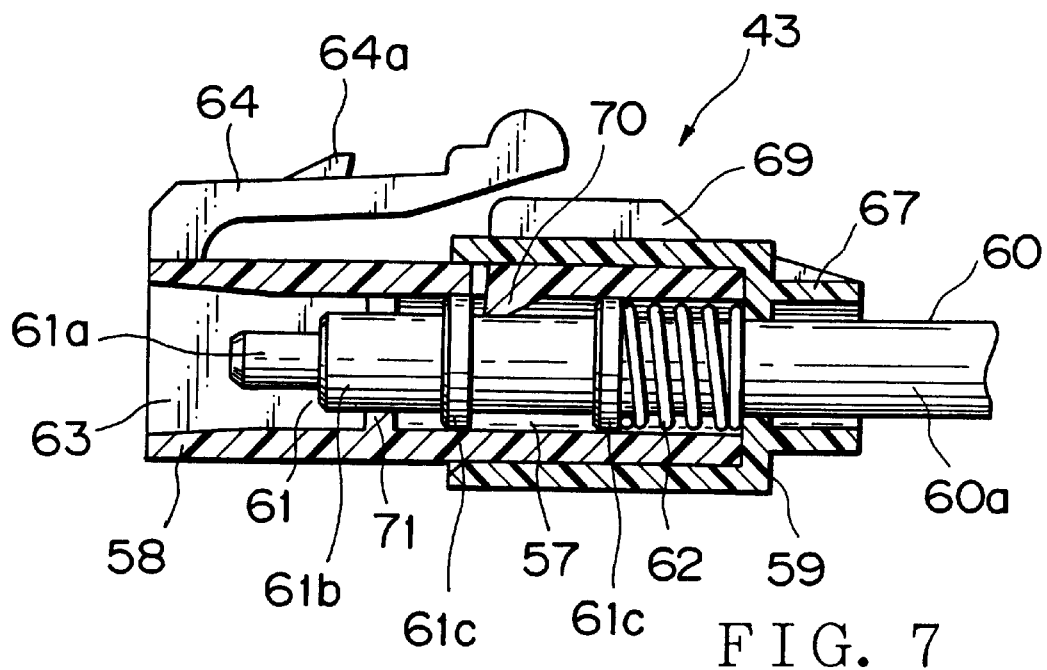
FIG. 7 is a sectional view in a vertical direction of an optical plug.

On the other hand, the optical plug 43 includes a pair of ferule assemblies 57, a plug housing of synthetic resin and a pair of spring caps 59 (each one of these elements is illustrated in FIG. 7).

Each ferule assembly 57 includes an optical fiber 60, a ferule 61 mounted on the end thereof and a spring 62.

The optical fiber 60 includes an optical propagating member 60b (FIG. 8) (which is composed of a core (not shown) and a cladding with a smaller refractive index than of the core), a primary sheath (not shown) and a secondary sheath 60a which cover the optical propagating member. A ferule 61 is covered with the primary sheath (not shown) and the secondary sheath 60a which are peeled off at their terminals.

The ferule 61 of synthetic resin has a small-diameter portion 61a and a larger-diameter portion 61b which are cylindrical. The optical propagating member 60b (FIG. 8) of the optical fiber 60 is accommodated in the small diameter portion 61a, and the primary sheath (not shown) is accommodated in the large diameter portion 61b. The ferule 61 and the optical fiber 60 are firmly fixed to each other by adhesive so that the optical fiber 60 is come off from the ferule 61 (FIG. 7).

The larger-diameter portion 61b is circumferencially provided with two flanges 61c. A spring 62 is located between the rear flange 61c and spring cap 59.

A plug housing 58 is a square box having two chambers 63 (only one of them is illustrated) for accommodating the ferule assemblies 57, respectively. The plug housing 58 has a locking arm 64 formed integrally thereto so as to extend rearward from the front end of the upper wall at a position where the chambers 63 are separated from each other.

The locking arm 64 has an engagement protrusion 64a to be engaged with an engagement hole 50a of the optical plug engagement portion 50 (FIGS. 3 and 4). The optical plug 43 can be fit into the receptacle 42 by pressing down the tip of the locking arm 64 (FIG. 3).

As shown in FIG. 3, the plug housing 58 has strip-like slit covers 65 which are projected rearward from both sides of the rear end and serve to close plug-introduction slits of the spring cap 59 described later.

As seen from FIGS. 3 and 7, the spring cap 59 has the plug introduction slits 66 (only one of them is illustrated) recessed over its both side walls and rear end. In the vicinity of the plug introduction slits 66 at the rear end, the spring cap has supporting walls 67 projected from the rear end.

The spring cap 59 has an concave portion 68 formed at the center of its upper wall, which mates to the locking arm 64. Protection walls 69 are formed upright on both sides of the concave portion 68.

The interior of the rear end of the spring cap 59 is kept in contact with the spring 62 (FIG. 7). At the center of the inside of the spring cap 59, an engagement protrusion (not shown) to be mated with the plug housing 58 is formed.

The optical plug 43 is assembled in such a manner that the ferule assemblies 57 is mounted into the spring cap 59 through the plug introduction slits 66 and the spring cap 59 is engaged with the plug housing 58. When the ferule assembly is accommodated in the chamber 63, the engagement protrusion 70 formed at the plug housing is fit between two flanges 61c to restrict the position of the ferule assembly 57.

The ferule assembly 57 is urged forward by the spring 62 and a stopper formed in the chamber 63 restricts protruding of the ferule assembly.

In the configuration described above, when the optical plug 43 is fit into the receptacle 42, the receiving cylinders 52 move into the plug housing 58. Simultaneously, the small diameter portions 61a of the ferule assemblies 57 move into the receiving cylinders 52, respectively. The larger diameter portions 61b of the ferule assemblies 57 are brought into contact with the receiving cylinders 52 so that a suitable contact pressure is kept by the elastic force of the springs 62.

In this state, minimum gaps (not shown) are held between the tips of the ferule assemblies 57 and the sleeves 21 and between the light-receiving and light-emitting element modules 46 and 47 and the sleeves 21.

Figure 8:
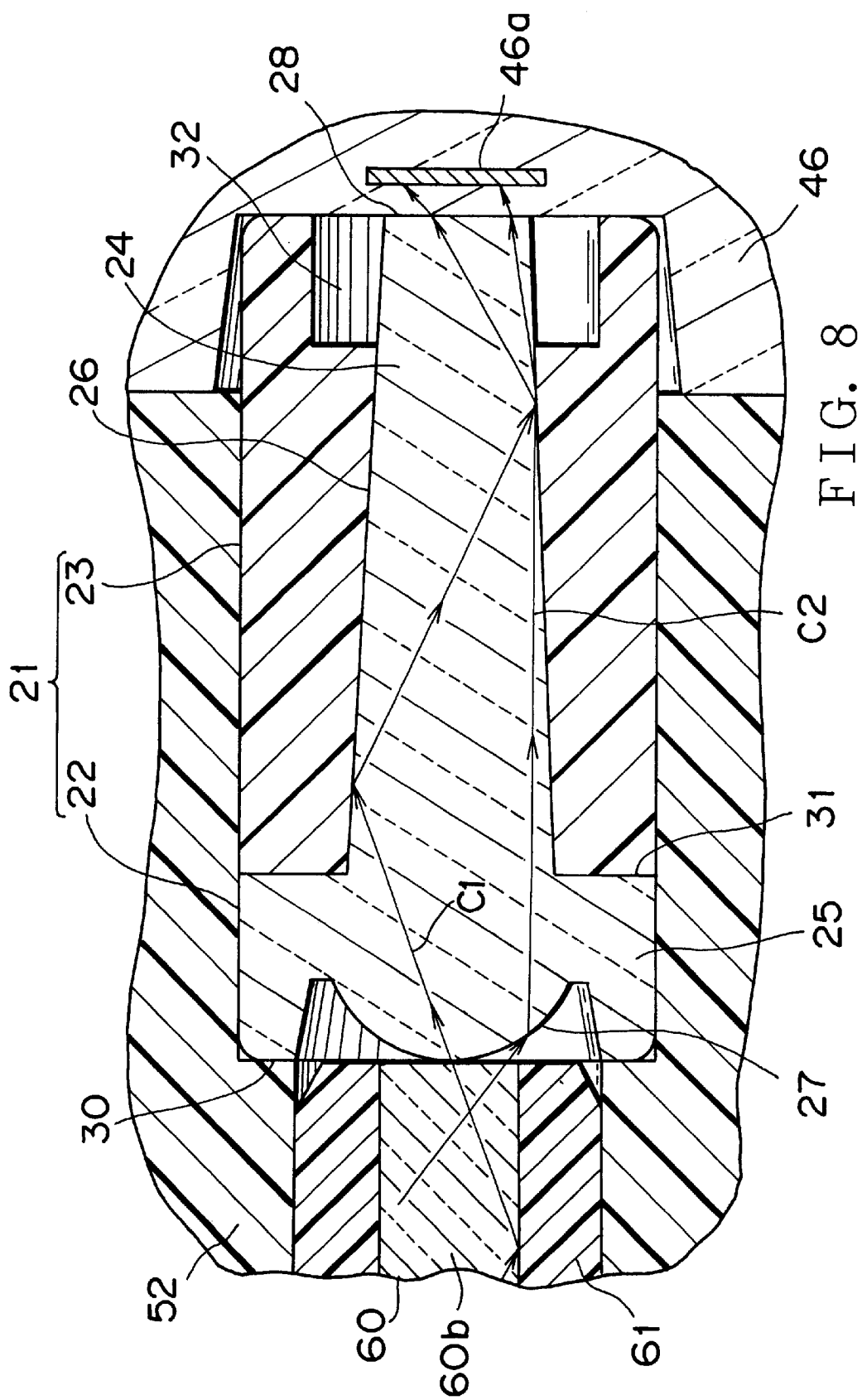
FIG. 8 is an enlarged sectional view in a vertical direction of an optical plug fit into a receptacle.

In FIG. 8, as illustrated by arrows, light beams C1 and C2, which have been propagated through the optical propagating member 60b of the optical fiber 60 while repeating total reflection, emit from the end face (light-emitting face) of the optical propagating member 60b and are incident on the sleeve 21 through the lens 27. In this case, since the side wall 26 of the waveguide 24 is tapered toward the light-receiving element module 46 and the cladding 23 forms a boundary in contact with the side wall 26, the light beams are converged while repeating the total reflection. The converged light beams C1 and C2 outgo from the end face of the waveguide 24 and are incident on the light-receiving element 46*a* of the light receiving element module 46 with no loss.

Although not illustrated in FIG. 8, the light beam (not shown) of the light emitting element module 47 is incident on the sleeve 21 through the lens 27 (see FIG. 6). The light beam is converged while repeating the total reflection in the waveguide 24, and outgoes from the end face 28 of the waveguide 24 toward the optical propagating member 60*b* of the optical fiber 60.

As described referring to FIGS. 3 to 8, the light beam emitted from one of the optical propagating member 60*b* of the optical fiber 60 and light emitting element module 47 is received and converged by the lens 27 of the core 22. In addition, the light beam is propagated through the waveguide and is gradually converged while repeating the total reflection. Thus, the transmission efficiency between the optical propagating member and the light-receiving or emitting element module 46 or 47 can be greatly improved.

Accordingly, in accordance with the invention, the sleeve and receptacle can be improved as compared with them according to the prior art.

Further, even if there is discrepancy between the optical propagating member or light-emitting element module and the optical axis, it can be relaxed by the presence of the lens 27.

Further, the side wall 26 of the waveguide 24, which is protected by the cladding 23, does not influence the transmission efficiency of light. The protection of the side wall 26 also makes it easy to carry out the work relative to assembling and production management.

Figure 9:
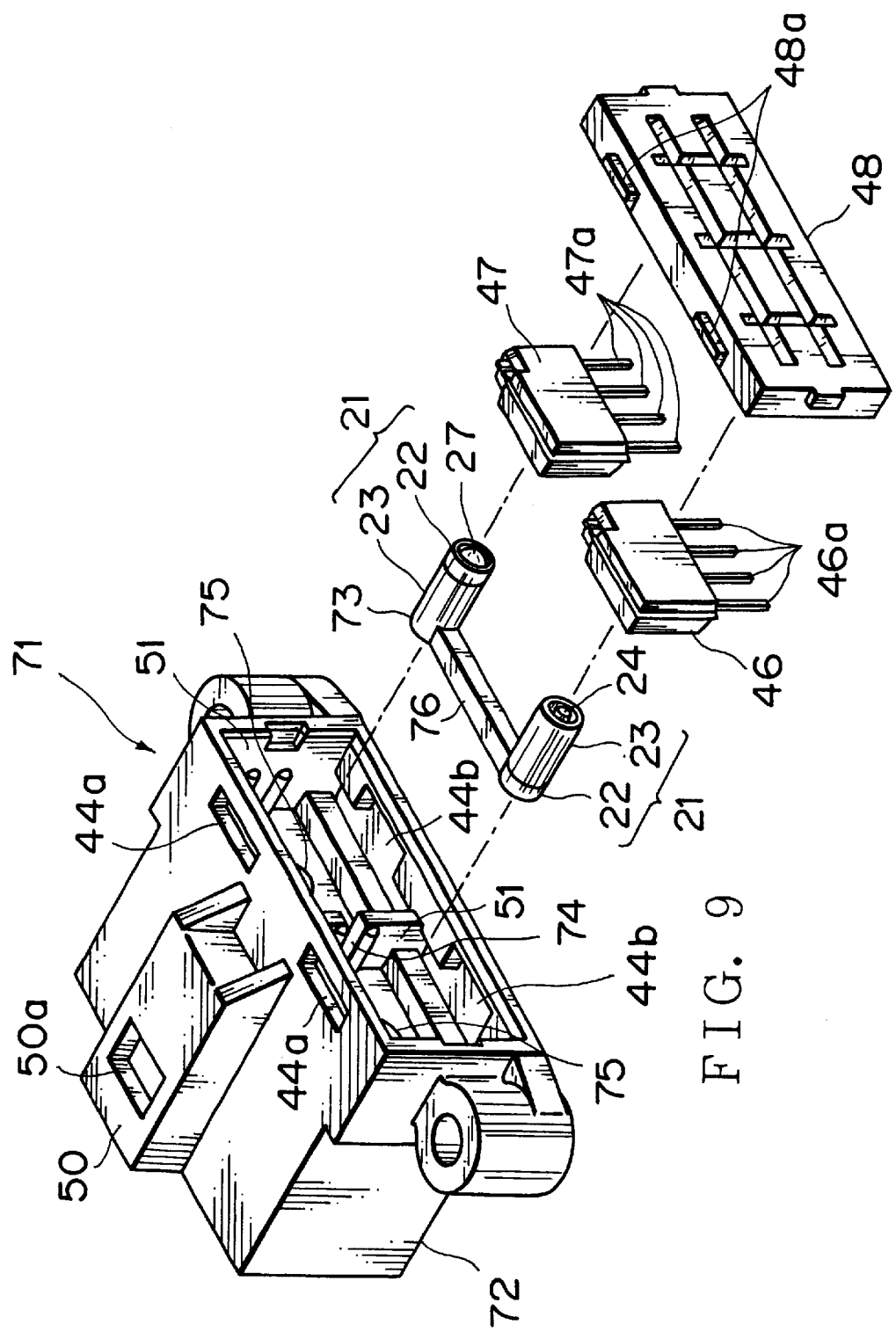
FIG. 9 is an exploded perspective view of a receptacle for explaining another example of the sleeve according to the invention.

Now referring to FIG. 9, an explanation will be given of another example of the sleeve 21 (FIGS. 1 and 2). FIG. 9 is an exploded perspective view of the receptacle. In FIG. 9, like reference numerals refer to like elements in the first example.

In FIG. 9, a receptacle 71 includes a connector housing 72; a composite sleeve (for the optical connector) 73, a light receiving element module 46 and a light emitting element module 47 which are housed in the housing 72; and a cap 48 put on the connector housing.

The connector housing 72 has a slit 74 corresponding to a composite sleeve 73. The slit 74 is formed to extend to the receiving cylinders (The remaining configuration of the connector housing 72 is the same as the connector housing 44 (FIG. 4).

The composite sleeve 73 is structured so that a pair of sleeves 21 in parallel are coupled with each other by a coupling portion 76 by resin molding. Therefore, the connector housing 72 can be assembled by making an insertion operation only once. The function of the sleeve is of course the same as the example described above.

Figure 10:
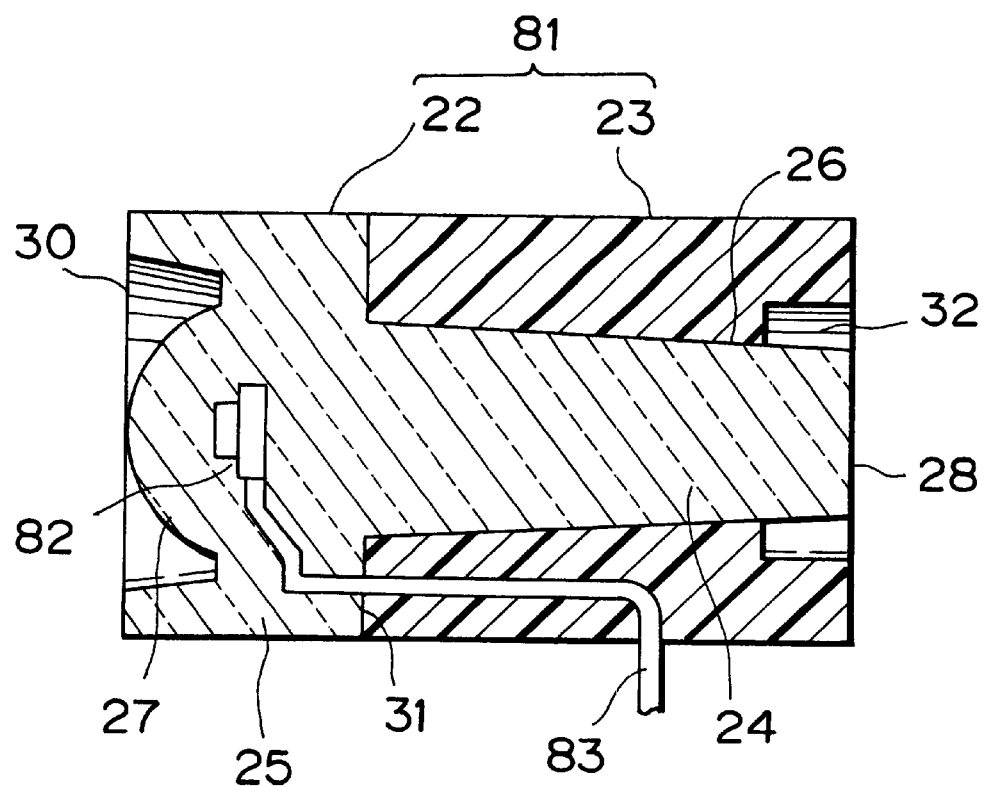
FIG. 10 is a sectional view of an example of the sleeve which is used for bi-directional communication of a single-core optical fiber.

Now referring to FIG. 10, an explanation will be given of the sleeve used for one-core type optical fiber bi-directional communication which is an application of the above example. FIG. 10 is a sectional view of the sleeve. Like reference numerals refer to like elements in the embodiments previously explained. The sleeve is located between the optical fiber and the light receiving element module.

In FIG. 10, a sleeve 81 is providedwith a light-emitting diode 82 serving as a light emitting element embedded in the waveguide 24 of the core 22. The light emitting diode 82 is arranged on a center axis of the waveguide 24. A plurality of electrodes 83 (only one of them is illustrated) are extended externally from the guide 25, end face 31 and cladding 23.

The operation of the sleeve 81 will be explained below. The received light beams propagated through the optical fiber while repeating total reflection outgoes from the terminal of the optical fiber and is incident on the sleeve 81 through the lens 27.

In this case, since the side wall 26 of the waveguide 24 is tapered toward the light receiving element module 46 and the cladding 23 forms a boundary in contact with the side 26, the light beam is converged while repeating the total reflection. The converged light beams outgoes from the end face of the waveguide and is incident on the light-receiving element of the light receiving element module 46 with no loss.

On the other hand, the transmission light beam from the light-emitting diode 82 is collimated by the lens 27 and incident on the terminal of the optical fiber. The light beam is propagated through the optical fiber and is eventually coupled with the optical plug (not shown).

Figure 11:
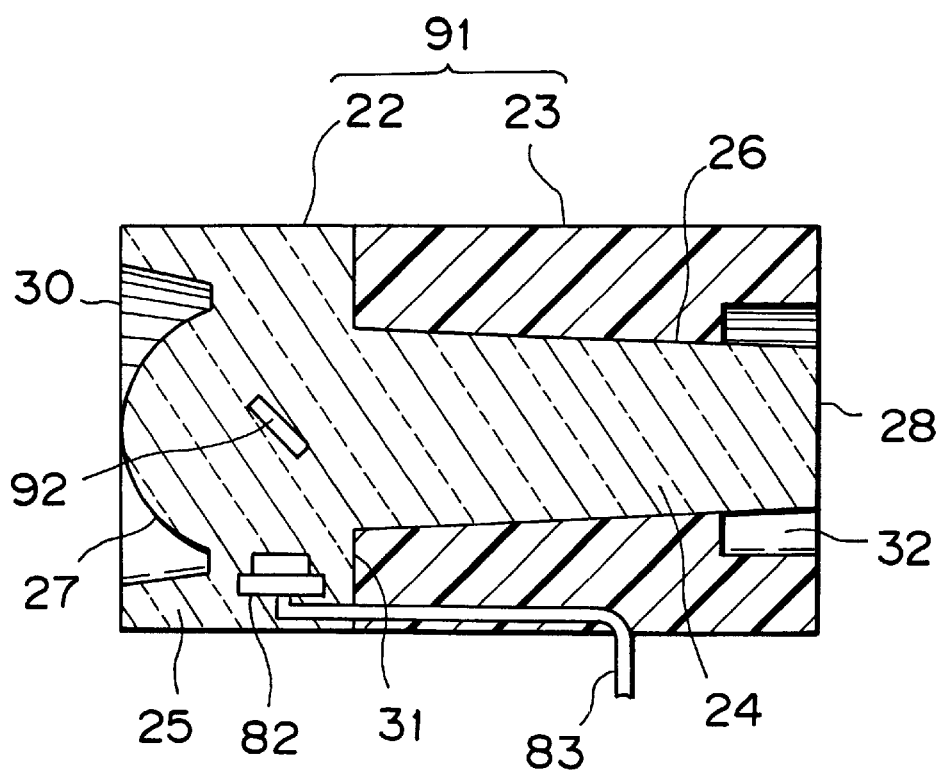
FIG. 11 is a sectional view of another example of the sleeve for the bi-directional communication.

FIG. 11 is a sectional view of an alternative example of the sleeve illustrated in FIG. 10. In the sleeve 91, the passage of the transmission light from the light-emitting diode 82 is changed. Specifically, the transmission light from the light-emitting diode 82 is incident on the terminal of the optical fiber through the reflection by a mirror (reflecting member) 92. The light-emitting diode 82 embedded in the guide 25 has a light-emitting face defined so that the transmission light outgoes toward the central axis of the waveguide 24. On the other hand, the mirror 92 is embedded on the center axis of the waveguide 24 in a such a fashion that it is slanted by about 45° from the light emitting face. Aplurality of electrodes 83 (only one of them is illustrated) are extended externally from the end face 31 of the guide 25 and cladding 23.

The operation of the sleeve 91 will be explained below. The transmission light emitted from the light-emitting diode 82, after it has been totally reflected by the mirror 92, is collimated by the lens 27, and incident on the terminal of the optical fiber. The light is propagated through the optical fiber and is coupled with the optical plug (not shown).

On the other hand, the reception light propagated through the optical fiber is propagated in the same manner described in connection with the sleeve 81.

The sleeve and the one-core type fiber bi-directional communication system can provide the effects of miniaturization, cost reduction and improvement in reliability as well as the effect of the sleeve itself.

The present invention can be realized in various modifications without departing from the spirt of the invention. The sleeves 21, 81 and 91 may have an entire length not coincident with, and about three-times as long as that of the conventional sleeve.

What is claimed is:

1. A sleeve for an optical connector comprising:

a core of transparent synthetic resin; and a cladding of transparent synthetic resin and having a smaller refractive index than the core, wherein said core includes an optical waveguide, extending along an optical axis, the waveguide comprising a taper in a conical shape around the axis and a lens formed at the large diameter end of the waveguide, said lens receiving light and converging it, and said cladding is formed concentrically with the core in intimate contact with an outer wall of the core.

2. A sleeve according to claim 1, wherein said core has a circular flange-like guide integral to the outer wall in the vicinity of said lens, said guide having a belt-shaped circumferential surface to be coplanar with that of the cladding.

3. A sleeve according to claim 2, wherein said guide has an end face flush with an apex of said lens.

4. A sleeve according to claim 1, comprising a groove or projection formed on an outer surface thereof.

5. A sleeve according to claim 1, wherein said sleeve has an open space formed at a small diameter end of the waveguide so as to separate the core from the cladding.

6. A sleeve according to claim 1, wherein said cladding is made distinguishable from the core and colored so as to reflect light propagated through said waveguide.

7. A sleeve according to claim 1, wherein said lens is covered with an antireflective coating.

8. A sleeve according to claim 1, further comprising a light emitting element embedded in the waveguide.

9. A receptacle including a sleeve as defined in claim 1 and optical element modules including a light emitting element module and a light receiving element module, wherein said sleeve is located between each of said optical element modules and a corresponding one of two fibers of an optical plug coupled with said receptacle.

* * * * *